US009686531B2

(12) United States Patent
Ko et al.

(10) Patent No.: US 9,686,531 B2
(45) Date of Patent: Jun. 20, 2017

(54) MOBILE TERMINAL AND CONTROL METHOD THEREOF

(71) Applicant: LG ELECTRONICS INC., Seoul (KR)

(72) Inventors: Dongseuck Ko, Suwon (KR); Jeeyoung Cheon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 639 days.

(21) Appl. No.: 13/649,322

(22) Filed: Oct. 11, 2012

(65) Prior Publication Data

US 2013/0128000 A1    May 23, 2013

(30) Foreign Application Priority Data

Nov. 22, 2011   (KR) .................. 10-2011-0122436

(51) Int. Cl.
*H04N 13/02*    (2006.01)
(52) U.S. Cl.
CPC ..... *H04N 13/0239* (2013.01); *H04N 13/0246* (2013.01); *H04N 13/0296* (2013.01)
(58) Field of Classification Search
CPC ........... H04N 13/0239; H04N 13/0296; H04N 13/0246
USPC .......................................................... 348/47
See application file for complete search history.

(56) References Cited

U.S. PATENT DOCUMENTS

| 2009/0128621 | A1  | 5/2009 | Passmore et al. |
| 2010/0194860 | A1  | 8/2010 | Mentz et al. |
| 2011/0069151 | A1* | 3/2011 | Orimoto ................ G03B 35/00 348/42 |
| 2011/0211751 | A1* | 9/2011 | Thorpe ................... G06T 7/002 382/154 |

(Continued)

FOREIGN PATENT DOCUMENTS

| CN | 101248409 A  | 8/2008 |
| EP | 0 563 737 A1 | 10/1993 |
| EP | 1 383 342 A2 | 1/2004 |

OTHER PUBLICATIONS

European Search Report for Application 12193680.1 dated Dec. 13, 2013.

(Continued)

*Primary Examiner* — Tung Vo
*Assistant Examiner* — Rowina Cattungal
(74) *Attorney, Agent, or Firm* — Ked & Associates, LLP (57) ABSTRACT

A mobile terminal may include a camera module and a controller. The camera module may include a first capture unit to capture a subject to acquire a first image, a second capture unit to capture the subject to acquire a second image, an actuator disposed at least one of the first capture unit and the second capture unit, and a drive unit configured to drive the actuator. The controller may analyze a perceived 3-dimensional (3D) image formed by using the first image and the second image, and may produce a relative position compensation value corresponding to a relative displacement between the first capture unit and the second capture unit according to a result of the analysis. The drive unit may drive the actuator to control a relative position between the first capture unit and the second capture unit based on the relative position compensation value.

8 Claims, 9 Drawing Sheets

(56) References Cited

U.S. PATENT DOCUMENTS

2012/0033046 A1\* 2/2012 Ozaki ................ H04N 13/0409
  348/46
2012/0062707 A1\* 3/2012 Seo .................... H04N 13/0239
  348/47

OTHER PUBLICATIONS

Chinese Office Action for Application 2012104593454 dated Jan. 30, 2015.

\* cited by examiner

MOBILE TERMINAL AND CONTROL METHOD THEREOF

CROSS-REFERENCE TO RELATED APPLICATION

This application claims the benefit of an earlier filing date and right of priority to Korean Application No. 10-2011-0122436, filed Nov. 22, 2011, the subject matter of which is hereby incorporated by reference.

BACKGROUND

1. Field

Embodiments may relate to a mobile terminal. More particularly, embodiments may relate to a mobile terminal and control method capable of generating 3-dimensional images.

2. Background

Terminals may be classified into a mobile terminal and a stationary terminal based on mobility. Terminals may be further classified into a handheld terminal and a vehicle mount terminal based on whether or not the terminal may be directly carried by a user.

The mobile terminal may capture still or moving images, play music or video files, play games, receive broadcast and the like, so as to be implemented as an integrated multimedia player. In order to support and enhance the function of the terminal, improvement of the terminal may be considered in the aspect of structure or software.

A 3-dimensional capture function may be mounted on the mobile terminal to provide 3-dimensional images to the user. The 3-dimensional capture function may capture a subject using two cameras (stereo camera) to acquire a left eye image and a right eye image, and may combine the left eye image with the right eye image to generate a 3-dimensional image. However, when a relative position between two cameras deviates from each other due to an external shock, or the like, quality of a 3-dimensional image may deteriorate.

BRIEF DESCRIPTION OF THE DRAWINGS

Arrangements and embodiments may be described in detail with reference to the following drawings in which like reference numerals refer to like elements and wherein.

DETAILED DESCRIPTION

Arrangements and embodiments may be described in detail with reference to the accompanying drawings to such an extent that embodiments may be easily embodied by a person having ordinary skill in the art to which the present invention pertains. However, embodiments may be implemented in various different forms, and therefore, embodiments are not limited to the illustrated embodiments. In order to clearly describe embodiments, parts not related to the description may be omitted, and like reference numerals designate like constituent elements throughout the specification.

A mobile device may include a portable phone, a smart phone, a laptop computer, a digital broadcast mobile device, a personal digital assistant (PDA), a portable multimedia player (PMP), a navigation, and/or the like. However, it would be easily understood by those skilled in the art that a configuration according to the following description may be applicable to a stationary terminal such as a digital TV, a desktop computer, and/or the like, excluding constituent elements particularly configured for mobile purposes.

Figure 1:
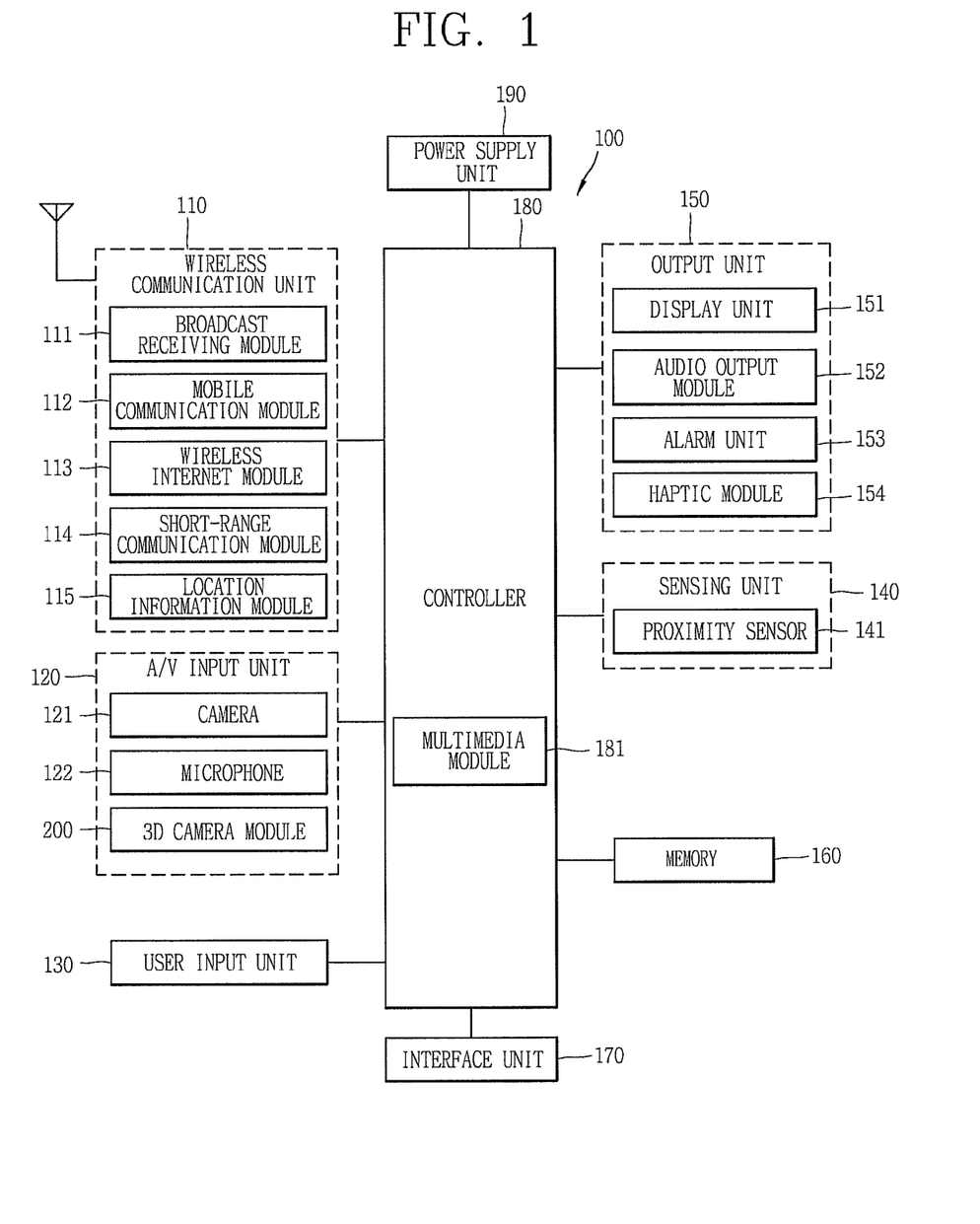
FIG. 1 is a block diagram illustrating a mobile terminal associated with an embodiment of the present invention.

FIG. 1 is a block diagram illustrating a mobile terminal associated with an embodiment of the present invention. Other embodiments and configurations may also be provided.

Referring to FIG. 1, a mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and/or the like. However, the constituent elements shown in FIG. 1 are not necessarily required, and the mobile terminal may be implemented with greater or less number of elements than those illustrated elements.

The wireless communication unit 110 may include one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115 (or position information module), and/or the like.

The broadcast receiving module 111 may receive broadcast signals and/or broadcast associated information from an external broadcast management server through a broadcast channel. The broadcast associated information may mean information regarding a broadcast channel, a broadcast program, a broadcast service provider, and/or the like. The broadcast associated information may also be provided through a mobile communication network, and in this example, the broadcast associated information may be received by the mobile communication module 112. The broadcast signal and/or broadcast-associated information received through the broadcast receiving module 111 may be stored in the memory 160.

The mobile communication module 112 may transmit and/or receive a radio signal to and/or from at least one of a base station, an external terminal and/or a server over a mobile communication network. The radio signal may include a voice call signal, a video call signal and/or various types of data according to text and/or multimedia message transmission and/or reception.

The wireless Internet module 113, as a module for supporting wireless Internet access, may be built-in or externally installed to the mobile terminal 100. The wireless Internet module 113 may use a wireless Internet technique including a WLAN (Wireless LAN), Wi-Fi, Wibro (Wireless Broadband), Wimax (World Interoperability for Microwave Access), HSDPA (High Speed Downlink Packet Access), and/or the like.

The short-range communication module 114 may be a module for supporting a short-range communication. The short-range communication module 114 may use a short-range communication technology including Bluetooth, Radio Frequency IDentification (RFID), Infrared Data Association (IrDA), Ultra WideBand (UWB), ZigBee, and/or the like.

The location information module 115 may be a module for checking, acquiring and/or determining a location of the mobile terminal 100. A global positioning system (GPS) module may be one example of the location information module 115.

The A/V (audio/video) input unit 120 may receive an audio or video signal, and the A/V (audio/video) input unit 120 may include a camera 121, a microphone 122, and/or the like. The camera 121 may process an image frame such as a still image or a moving image obtained by an image sensor in a video phone call or image capturing mode. The processed image frame may be displayed on a display unit 151 (or display). The image frames processed by the camera 121 may be stored in the memory 160 or may be transmitted to an external device through the wireless communication unit 110. Two or more cameras 121 may be provided according to a use environment of the mobile terminal 100.

The microphone 122 may receive an external audio signal through a microphone in a phone call mode, a recording mode, a voice recognition mode, and/or the like, and the microphone 122 may process the audio signal into electrical voice data. The processed voice data processed by the microphone 122 may be converted and outputted into a format that is transmittable to a mobile communication base station through the mobile communication module 112 in the phone call mode. The microphone 122 may implement various types of noise canceling algorithms to cancel noise (or reduce noise) generated in a procedure of receiving the external audio signal.

A 3D camera module 200 may include two cameras to capture a left eye image and a right eye image that form a 3-dimensional (3D) image. One of the two cameras may be configured to capture a left eye image, and the other one of the two cameras may be configured to capture a right eye image.

The user input unit 130 may generate input data to control an operation of the mobile terminal 100. The user input unit 130 may include a key pad, a dome switch, a touch pad (pressure/capacitance), a jog wheel, a jog switch, and/or the like.

The sensing unit 140 may detect a current status of the mobile terminal 100 such as an opened state or closed status of the mobile terminal 100, a location of the mobile terminal 100, an orientation of the mobile terminal 100, and/or the like, and the sensing unit 140 may generate a sensing signal for controlling an operation of the mobile terminal 100. For example, when the mobile terminal 100 is a slide phone type, the mobile terminal 100 may sense an opened status or a closed status of the slide phone. Further, the sensing unit 140 may take charge of a sensing function associated with whether or not power is supplied from the power supply unit 190, or whether or not an external device is coupled to the interface unit 170.

The sensing unit 140 may include a proximity sensor 141. The sensing unit 140 may include a touch sensor (not shown) for sensing a touch operation to the display unit 151.

The touch sensor may be implemented as a touch film, a touch sheet, a touch pad, and/or the like. The touch sensor may be configured to convert changes of a pressure applied to a specific part of the display unit 151 (or a capacitance occurring from a specific part of the display unit 151) into electric input signals. The touch sensor may be configured to sense not only a touched position and a touched area, but also a touch pressure.

When the display unit 151 and the touch sensor have a layered structure therebetween, the display unit 151 may be used as an input device rather than an output device. The display unit 151 may be referred to as a touch screen.

When there is a touch input through the touch screen, the corresponding signals may be sent to a touch controller (not shown). The touch controller may process the received signals, and then transmit data corresponding to the processed signals to the controller 180. Accordingly, the controller 180 may sense which region of the display unit 151 has been touched.

When the touch screen is implemented with a capacitance type, it may be configured such that proximity of a detection subject may be sensed by changes of an electromagnetic field. The touch screen may be categorized into a proximity sensor 141.

The proximity sensor 141 may refer to a sensor to detect presence or absence of a detection subject using an electromagnetic field or infrared rays without a mechanical contact. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and/or so on.

Hereinafter, for ease of explanation, a status that the pointer is positioned to be proximate onto the touch screen without contact may be referred to as a proximity touch, whereas a status that the pointer substantially comes in contact with the touch screen may be referred to as a contact touch.

The proximity sensor 141 may sense a proximity touch, and/or proximity touch patterns (e.g., distance, direction, speed, time, position, moving status, etc.). Information relating to the sensed proximity touch and the sensed proximity touch patterns may be output onto the touch screen.

The output unit 150 may be configured to provide an output associated with visual sense, auditory sense, tactile sense, and/or the like, and the output unit 150 may include the display unit 151, an audio output module 152, an alarm unit 153, a haptic module 154, and/or the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or an image capturing mode, the display unit 151 may display a captured image and/or a received image, a UI and/or a GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and/or an e-ink display.

At least one display (or display element) included in the display unit 151 may be configured with a transparent or optical transparent type to allow viewing of the exterior through the display unit 151. It may be referred to as a transparent display. An example of the transparent displays may include a transparent LCD (TOLED), and/or the like. Under this configuration, a user may view an object positioned at a rear side of a terminal body through a region occupied by the display unit 151 of the terminal body.

The display unit 151 may be implemented as two or more in number according to a configured aspect of the mobile terminal 100. For example, a plurality of the display units 151 may be arranged on one surface to be spaced apart from or integrated with each other, and/or may be arranged on different surfaces.

The audio output module 152 may output audio data received from the wireless communication unit 110 or stored in the memory 160, in a call-receiving mode, a call-placing mode, a recording mode, a voice recognition mode, a broadcast reception mode, and/or so on. The audio output module 152 may output audio signals relating to functions performed in the mobile terminal 100 (e.g., sound alarming a call received or a message received, and/or so on). The audio output module 152 may include a receiver, a speaker, a buzzer, and/or so on.

The alarm 153 (or alarm unit) may output signals notifying occurrence of events from the mobile terminal 100. The events occurring from the mobile terminal 100 may include call received, message received, key signal input, touch input, and/or so on. The alarm 153 may output not only video or audio signals, but also other types of signals such as signals notifying occurrence of events in a vibration manner. Since the video or audio signals may be output through the display unit 151 or the audio output unit 152, the display unit 151 and the audio output module 152 may be categorized as part of the alarm unit 153.

The haptic module 154 may generate various tactile effects that a user can feel. A representative example of the tactile effects generated by the haptic module 154 may include vibration. Vibration generated by the haptic module 154 may have a controllable intensity, a controllable pattern, and/or so on. For example, different vibrations may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and/or the like.

The haptic module 154 may be configured to transmit tactile effects through a user's direct contact, or a user's muscular sense using a finger or a hand. The haptic module 154 may be implemented as two or more in number according to configuration of the mobile terminal 100.

The memory 160 may store a program for processing and controlling the controller 180. Alternatively, the memory 160 may temporarily store input/output data (e.g., phone-book, messages, still images, videos, and the like). The memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and/or the like. The mobile terminal 100 may operate in association with a web storage that performs a storage function of the memory 160 on the Internet.

The interface unit 170 may generally be implemented to interface the portable terminal with external devices connected to the mobile terminal 100. The interface unit 170 may allow a data reception from an external device, a power delivery to each component in the mobile terminal 100, and/or a data transmission from the mobile terminal 100 to an external device. The interface unit 170 may include wired/wireless headset ports, external charger ports, wired/wireless data ports, memory card ports, ports for coupling devices having an identification module, audio Input/Output (I/O) ports, video I/O ports, earphone ports, and/or the like, for example.

The identification module may be configured as a chip for storing various information required to authenticate an authority to use the mobile terminal 100, which may include a User Identity Module (UIM), a Subscriber Identity Module (SIM), and/or the like. The device having the identification module (hereinafter referred to as an identification device) may be implemented as a type of smart card. The identification device may be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 may control overall operations of the mobile terminal 100. For example, the controller 180 may perform control and processing associated with telephony calls, data communications, video calls, and/or the like. The controller 180 may include a multimedia module 181 that provides multimedia playback. The multimedia module 181 may be configured as part of the controller 180 or as a separate component. The controller 180 may perform a pattern recognition processing so as to recognize writing or drawing input carried out on the touch screen as text or image.

The power supply unit 190 may receive external and internal power to provide power required for various components under the control of the controller 180.

Various embodiments described herein may be implemented in a computer or similar device readable medium using software, hardware, and/or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform functions described herein. In some cases, embodiments may be implemented in the controller 180.

For software implementation, embodiments such as procedures or functions may be implemented together with separate software modules that allow performing of at least one function or operation. Software codes may be implemented by a software application written in any suitable programming language. The software codes may be stored in the memory 160 and executed by the controller 180.

The processing method of a user input to the mobile terminal 100 may be described.

The user input unit 130 may be manipulated to receive a command for controlling an operation of the mobile terminal 100. The user input unit 130 may include a plurality of manipulation units. The manipulation units may be designated as a manipulating portion. Any method may be employed if it is a tactile manner allowing the user to perform manipulation with a tactile feeling.

Various kinds of visual information may be displayed on the display unit 151. The visual information may be displayed in a form of characters, numerals, symbols, graphics, or icons, and/or may be implemented in perceived three-dimensional solid images. For an input of the visual information, at least one of the characters, the numerals, the symbols, the graphics, or the icons may be displayed with a predetermined arrangement so as to be implemented in a form of keypad. Such a keypad may be referred to as a soft key.

The display unit 151 may operate on an entire region or operate by dividing into a plurality of regions. In the latter example, the plurality of regions may be configured to operate in an associative way. For example, an output window and an input window may be displayed on the upper portion and the lower portion of the display unit, respectively. The output window and the input window may be regions allocated to output or input information, respectively. A soft key on which numerals for inputting phone numbers and/or the like are displayed may be outputted on the input window. When the soft key is touched, numerals corresponding to the touched soft key may be displayed on the output window. When the manipulating unit is manipulated, a call connection for the phone number displayed on the output window may be attempted or a text displayed on the output window may be input to an application.

The display unit 151 or the touch pad may be configured to sense a touch scroll. The user may move an object displayed on the display unit 151 (e.g. a cursor or pointer placed on an icon) by scrolling the display unit 151 or the touch pad. Moreover, when a finger is moved on the display unit 151 or the touch pad, a path being moved by the finger may be visually displayed on the display unit 151. It may be useful to edit an image displayed on the display unit 151.

In order to cope with an example where the display unit 151 and the touch pad are touched together within a predetermined period of time, one function of the mobile terminal 100 may be executed. One example of being touched together is when the user clamps a terminal body of the mobile terminal 100 using a thumb and a forefinger. For one of the functions executed in the mobile terminal 100, there may be an activation or de-activation for the display unit 151 or the touch pad.

Figure 2A:
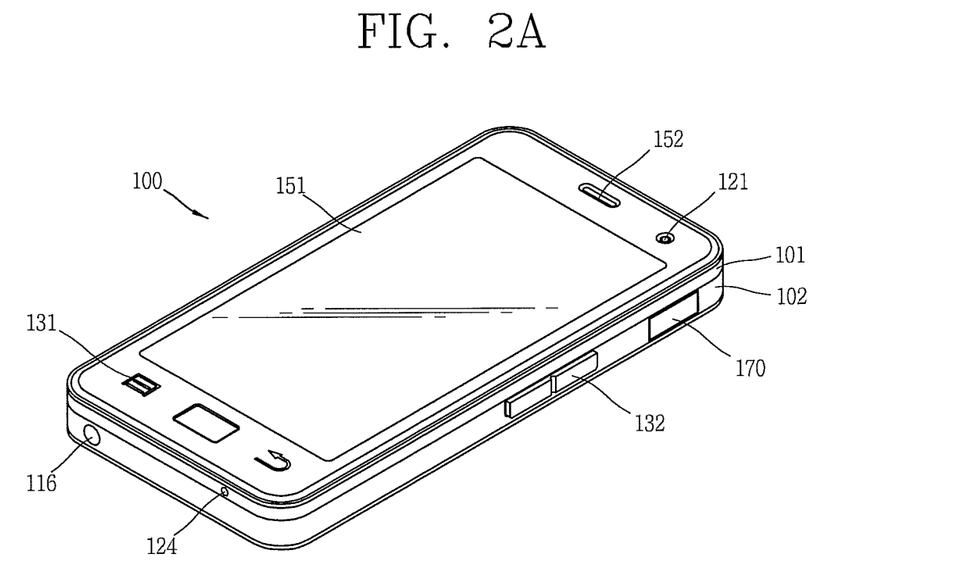
FIGS. 2A and 2B are perspective views illustrating an external appearance of a mobile terminal associated with an embodiment of the present invention.
Figure 2B:
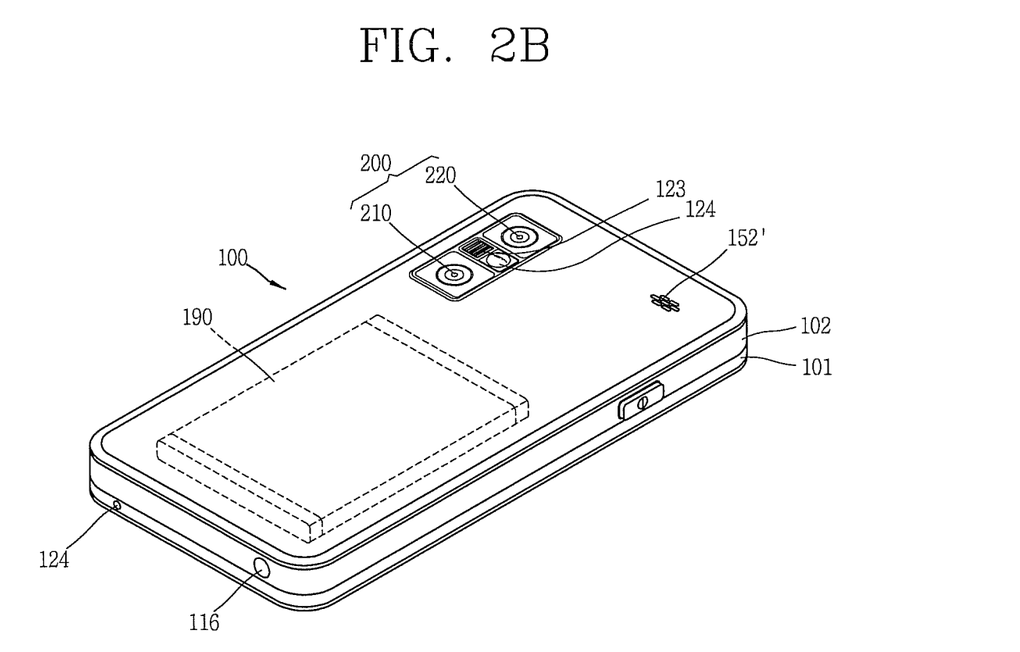

FIGS. 2A and 2B are perspective views illustrating an external appearance of a mobile terminal associated with the present invention. FIG. 2A illustrates a front surface and one lateral surface of the mobile terminal 100. FIG. 2B illustrates a rear surface and the other lateral surface of the mobile terminal 100. Other embodiments and configurations may also be provided.

FIG. 2A shows the mobile terminal 100 provided with a bar-type terminal body. However, embodiments are not limited to this type of terminal, but are also applicable to various structures of terminals such as slide type, folder type, swivel type, swing type, and/or the like, in which two and more bodies are combined with each other in a relatively movable manner.

The terminal body may include a case (casing, housing, cover, etc.) forming an appearance of the terminal. In this embodiment, the case may be divided into a front case 101 and a rear case 102. At least one middle case may be additionally provided between the front case 101 and the rear case 102.

The cases may be formed by injection-molding a synthetic resin and/or may be also formed of a metal material such as stainless steel (STS), titanium (Ti), and/or the like.

The display unit 151, the audio output module 152, the camera 121, the user input unit 130 (FIG. 1), the microphone 122, the interface unit 170, and/or the like may be arranged on the terminal body, mainly on the front case 101.

The display unit 151 may occupy most of the front case 101. The audio output unit 152 and the camera 121 may be provided on a region adjacent to one of both ends of the display unit 151, and the user input unit 131 and the microphone 122 may be provided on a region adjacent to the other end thereof. The user interface 132 and the interface unit 170, and/or the like may be provided on a lateral surface of the front case 101 and the rear case 102.

The user input unit 130 may be manipulated to receive a command for controlling an operation of the mobile terminal 100. The user input unit 130 may include a plurality of manipulation units 131, 132.

A first manipulating unit 131 or a second manipulating unit 132 may receive various commands. The first manipulation unit 131 may be used to receive a command, such as start, end, scroll, and/or the like. The second manipulation unit 132 may be used to receive a command, such as controlling a volume level being outputted from the audio output unit 152, or switching it into a touch recognition mode of the display unit 151.

As shown in FIG. 2B, a camera 121' may be additionally mounted on a rear surface of the terminal body (i.e., the rear case 102). The camera 121' may have an image capturing direction that is substantially opposite to the direction of the camera 121 (FIG. 2A), and may have different pixels from those of the first video input unit 121.

For example, the camera 121 may have a relatively small number of pixels enough not to cause a difficulty when the user captures his or her own face and sends it to the other party during a video call or the like, and the camera 121' may have a relatively large number of pixels since the user often captures a general object that is not sent immediately.

The cameras 121, 121' may be provided in the terminal body in a rotatable and popupable manner.

A flash 123 and a mirror 124 may be additionally provided adjacent to the camera 121'. The flash 123 may illuminate light toward an object when capturing the object with the camera 121'. The mirror 124 may allow the user to look at his or her own face, and/or the like, in a reflected way when capturing himself or herself (in a self-portrait mode) by using the camera 121'.

An audio output unit 152' may be additionally provided on a rear surface of the terminal body. The audio output unit 152' together with the audio output unit 152 (FIG. 2A) may implement a stereo function, and the audio output unit 152' may also be used to implement a speaker phone mode during a phone call.

An antenna 116 for receiving broadcast signals may be additionally provided on a lateral surface of the terminal body. The antenna 116 constituting the broadcast receiving module 111 (FIG. 1) may be provided so as to be pulled out from the terminal body.

The power supply unit 190 for supplying power to the mobile terminal 100 may be mounted on the terminal body. The power supply unit 190 may be configured so as to be incorporated in the terminal body, or may be directly detachable from the outside of the terminal body.

The mobile terminal 100 capable of enhancing quality of a perceived 3-dimensional (3D) image being acquired through the 3D camera module 200 may now be described.

Figure 3:
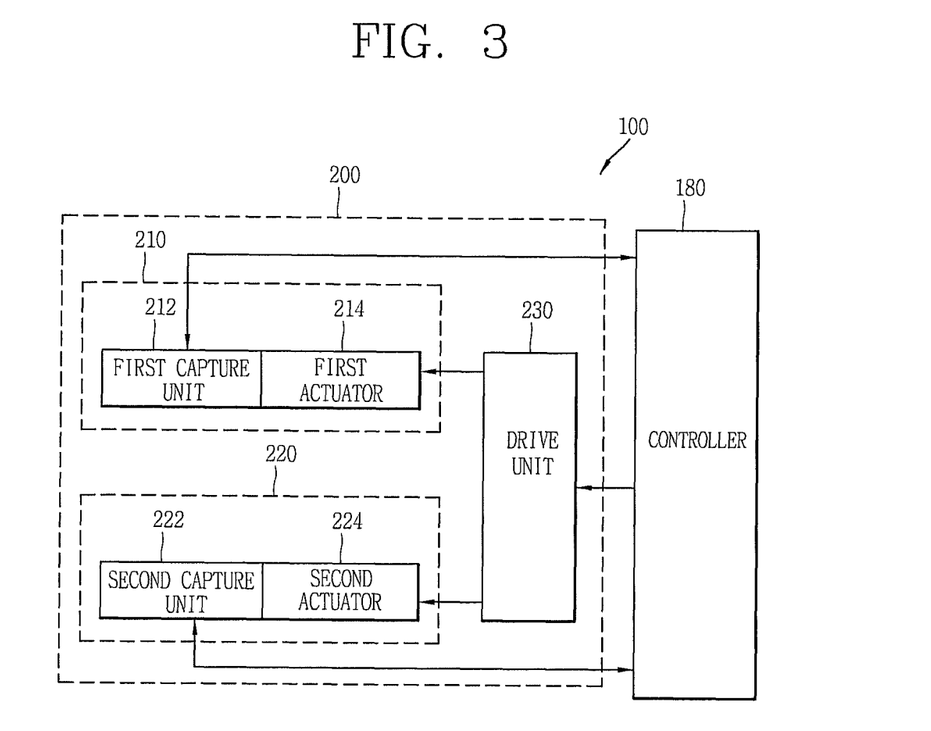
FIG. 3 is a block diagram illustrating a mobile terminal having a 3D camera module according to an embodiment of the present invention.

FIG. 3 is a block diagram illustrating a mobile terminal having a 3D camera module according to an embodiment of the present invention. Other embodiments and configurations may also be provided.

FIG. 3 shows that the 3D camera module 200 may include two cameras 210, 220 and a drive unit 230. The 3D camera module 200 may be referred to as a stereoscopic camera.

Although FIG. 3 shows the 3D camera module 200 having two actuators 214, 224, the 3D camera module 200 according to example embodiments are not limited to this. A single actuator may be provided at either one of the first capture unit 212 and the second capture unit 222.

The first camera 210 may include a first capture unit 212 and a first actuator 214. The second camera 220 may be disposed to be separated from the first camera 210, and the second camera 220 may include a second capture unit 222 and a second actuator 224. The first camera 210 may be mainly described, and redundant description between the first camera 210 and the second camera 220 may be omitted.

The first camera 210 may include a case (not shown) for accommodating the first capture unit 212 and the first actuator 214. An internal space, which is sufficient to move the first capture unit 212, may be formed according to control of the first actuator 214. For example, movement, rotation, tilting and/or the like in the first capture unit 212 may be carried out according to control of the first actuator 214 in an internal space of the case.

The first capture unit 212 may capture a subject to acquire (or receive) a first image. The first capture unit 212 may include a lens unit and an image sensor. More specifically, an optical signal received through the lens unit from a subject may be converted into an electrical signal by an image sensor to acquire a first image. A second image may be also acquired by the second capture unit 222. The acquired first image and the acquired second image may be used to form a perceived 3-dimensional (3D) image. The first image and the second image may be referred to as a left eye image and a right eye image, respectively.

As an example, the subject may be a person, an object, etc. Other types of subjects may also be provided.

The first actuator 214 may be disposed at the first capture unit 212 to control the first capture unit 212 in response to a drive signal of the drive unit 230. The first actuator 214 may be implemented by a voice coil motor (VCM), a piezoelectric motor, and/or the like.

The drive unit 230 may drive at least one of the first actuator 214 or the second actuator 224 to control a relative position between the first capture unit 212 and the second capture unit 222 according to control of the controller 180. The drive unit 230 may generate a drive signal based on a relative position compensation value supplied from the controller 180. The drive unit 230 may transfer the generated drive signal to at least one of the first actuator 214 or the second actuator 224.

The relative position compensation value may correspond to a relative displacement between the first capture unit 212 and the second capture unit 222. For example, a relative position between the first camera unit 210 and the second camera unit 220 or the first capture unit 212 and the second capture unit 222 may be deviated from each other due to an external shock applied to the mobile terminal 100. The relative position compensation value may denote a value produced to compensate a deviated amount of relative position (i.e., a relative displacement) between the first capture unit 212 and the second capture unit 222.

The controller 180 may receive the first image from the first capture unit 212 and may receive the second image from the second capture unit 222. The controller 180 may generate a perceived 3-dimensional (3D) image using the first image and the second image, and the controller 180 may produce a relative position compensation value according to the analysis result.

When a perceived 3-dimensional (3D) image is formed by using the first image and the second image acquired in a state that a relative position between the first capture unit 212 and the second capture unit 222 are deviated from each other, an image distortion may occur. As the image distortion is compensated, data may be lost from at least one of the first image or the second image. An amount of lost data may be associated with an amount of deviation of the relative position between the first capture unit 212 and the second capture unit 222. Accordingly, the controller 180 may produce a relative position compensation value based on the amount of data lost from at least one of the first image or the second image.

As described above, a compensation value may be produced according to a result of the analysis of a previously captured perceived 3-dimensional (3D) image, and a relative displacement between the first capture unit 212 and the second capture unit 212 may be compensated based on this, thereby enhancing a quality of a subsequently captured perceived 3-dimensional image.

The perceived 3-dimensional image may be displayed on the display unit 151.

A sensor for detecting a deviation of at least one location of the first capture unit 212 and/or the second capture unit 222 and a hardware structure (e.g. a fixed housing) for suppressing the deviation may not be needed, thereby providing the effect of size reduction and cost reduction in the mobile terminal 100.

Even if external shocks are frequently applied to the mobile terminal 100, a relative displacement between the first capture unit 212 and the second capture unit 222 may be compensated anytime since then, thereby enhancing reliability of a perceived 3-dimensional image capture.

Figure 4:
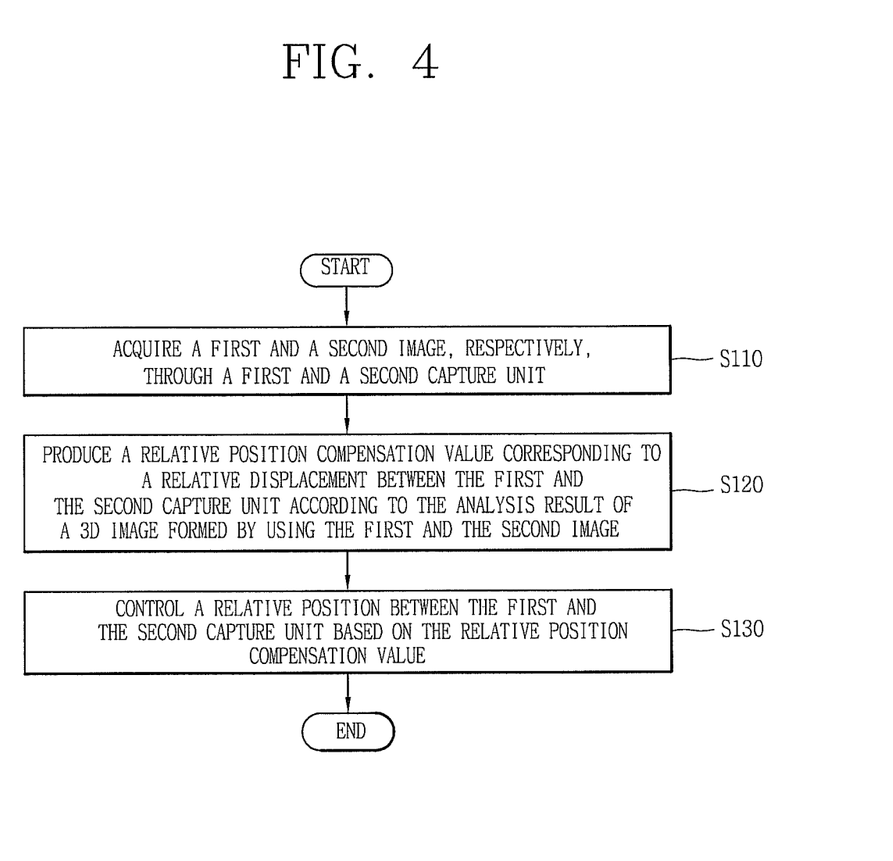
FIG. 4 is a flow chart for a method of controlling a mobile terminal according to an embodiment of the present invention.

FIG. 4 is a flow chart for a method of controlling a mobile terminal according to an embodiment. Other operations, orders of operations and embodiments may also be provided.

As shown in FIG. 4, an operation S110 includes capturing a subject (or object) through the first capture unit 212 and the second capture unit 222 (FIG. 3) to acquire a first image and a second image, respectively.

An operation S120 may include analyzing a perceived 3-dimensional (3D) image formed by using the first image and the second image, and producing a relative position compensation value corresponding to relative displacement between the first capture unit 212 and the second capture unit 222 according to the analysis result. An example of the method of producing a relative position compensation value may be described with respect to FIGS. 8A through 8C.

Subsequently, an operation S130 may include controlling a relative position between the first capture unit 212 and the second capture unit 222 based on the relative position compensation value. Controlling the relative position between the first capture unit 212 and the second capture unit 222 may denote controlling at least one location of the first capture unit 212 and the second capture unit 222. It may be provided to compensate a relative position between the first capture unit 212 and the second capture unit 222.

When either one location (or position) of the first capture unit 212 and the second capture unit 222 is deviated, it is not limited to control only the deviated capture unit, and the relative position between the first capture unit 212 and the second capture unit 222 may also be controlled by controlling the other capture unit.

Further, prior to compensating the relative position between the first capture unit 212 and the second capture unit 222, a displacement with respect to the reference position of the first capture unit 212 (hereinafter referred to as an absolute displacement) may be compensated. The 3D camera module 200 (FIG. 3) may include a displacement measurement sensor for measuring an absolute displacement of the first capture unit 212 (e.g. a hole sensor, a light-emitting/light-receiving diode, and/or the like). The controller 180 (FIG. 3) may produce an absolute position compensation value corresponding to the absolute displacement. The drive unit 230 may drive the first actuator 214 (FIG. 3) to control the location of the first capture unit 212 based on the absolute position compensation value.

As the absolute displacement of the first capture unit 212 is compensated, the first capture unit 212 may be placed (or provided) at the reference position. A center of the lens unit of the first capture unit 212 may correspond to an optical axis.

Subsequent to compensating an absolute displacement of the first capture unit 212, the operation S110 of acquiring the first image and the second image, the operation S120 of producing a relative position compensation value, and the operation S130 of controlling a relative position between the first capture unit 212 and the second capture unit 222 may be carried out.

Figure 5:
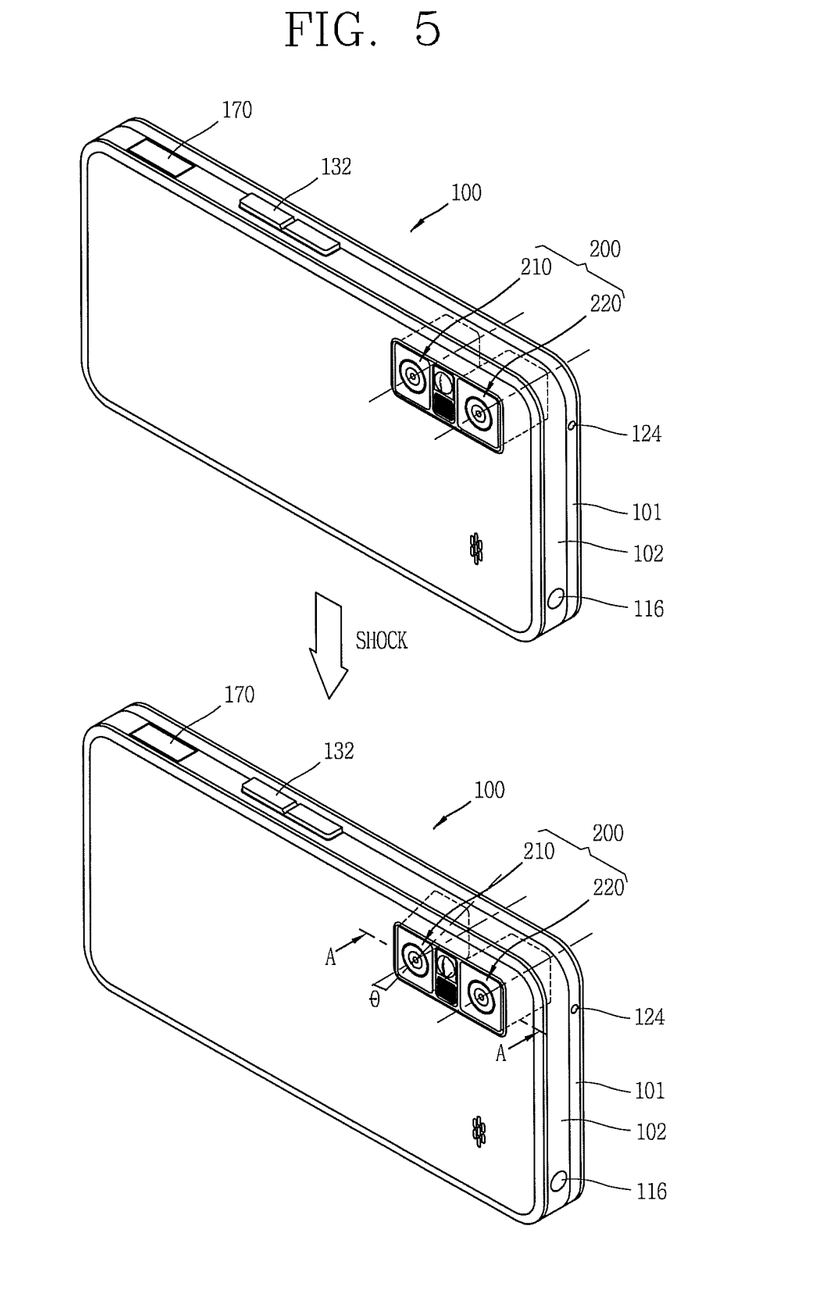
FIG. 5 is a view illustrating an example of a shape in which a 3D camera module is deformed due to an external shock.

FIG. 5 is a view illustrating an example of a shape in which the 3D camera module 200 is deformed due to an external shock. Other embodiments and configurations may also be provided.

FIG. 5 shows a rear surface of the mobile terminal 100 (e.g. a surface disposed with an exposed portion of the 3D camera module 200).

When an external shock is applied to (or received at) the mobile terminal 100 in a state that the first camera unit 210 and the second camera unit 220 of the 3D camera module 200 are provided at reference positions, respectively, the location (or position) of at least one of the first camera unit 210 or the second camera unit 220 may deviate. For example, the location of the first camera 210 may deviate by a rotation angle θ with respect to the reference position. The location of the first capture unit 212 (FIG. 3) provided in the first camera 210 may also deviate at a same time.

The method may now be described for compensating a relative displacement after at least one location of the first camera unit 210 and the second camera unit 220 is deviated.

Figure 6A:
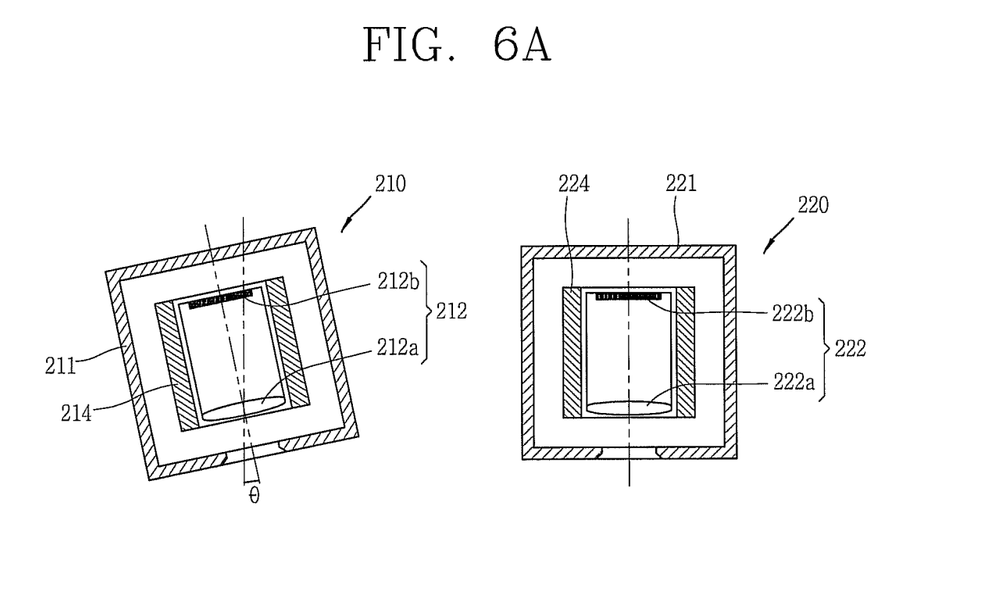
FIGS. 6A and 6B are views illustrating an example embodiment of the first camera and the second camera associated with the control method shown in FIG. 4.
Figure 6B:
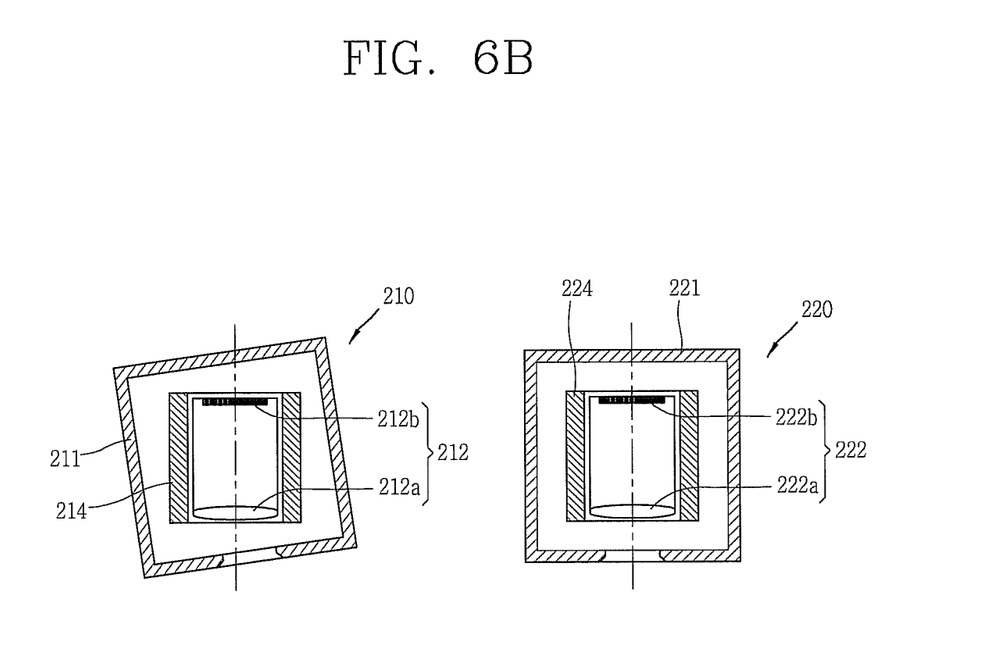
Figure 6C:
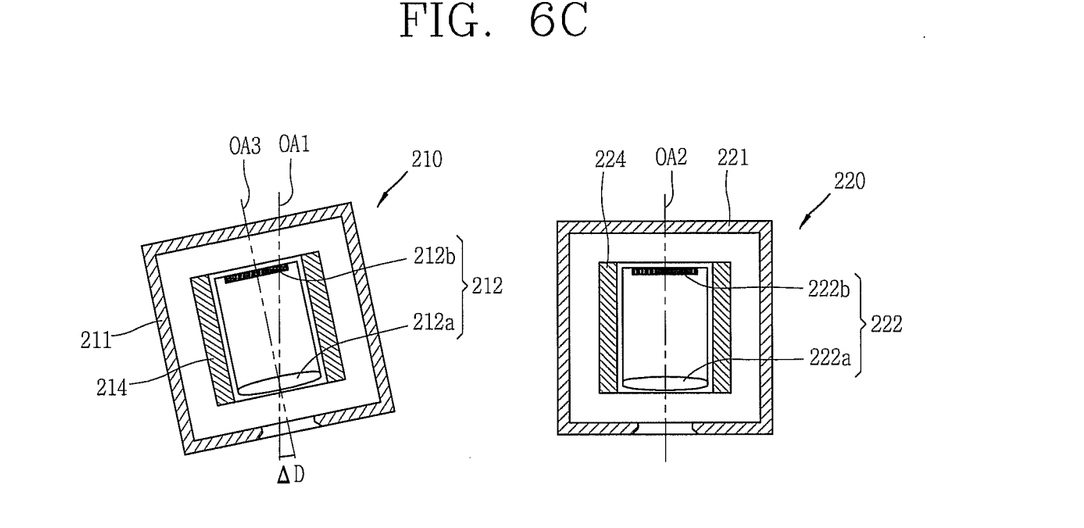
FIGS. 6C-6D are views showing a relative displacement of one optical axis according to an example embodiment.
Figure 6D:
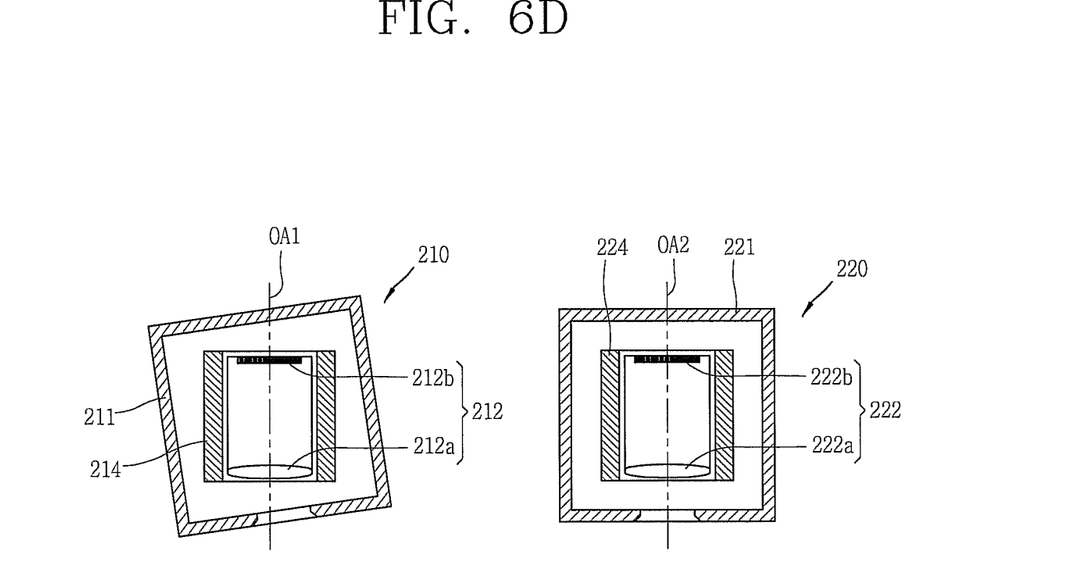
Figure 7A:
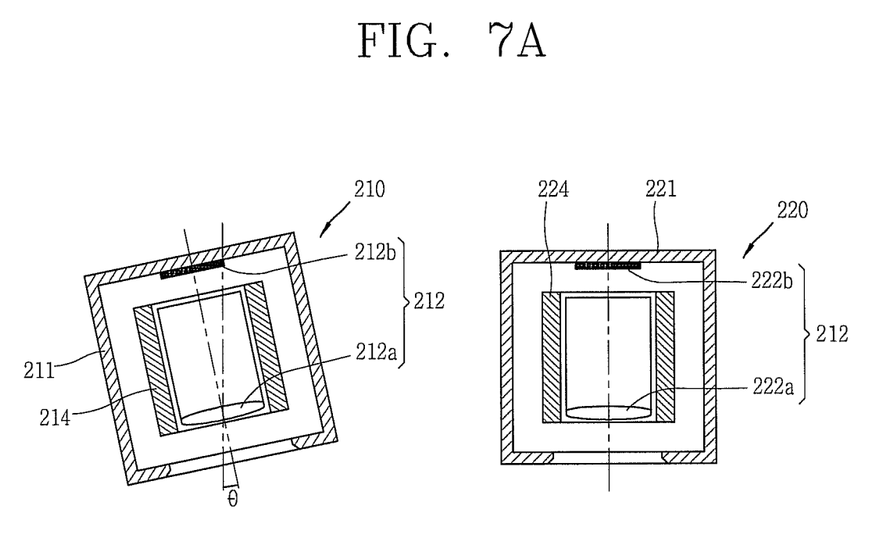
FIGS. 7A and 7B are views illustrating an example embodiment of the first camera and the second camera associated with the control method shown in FIG. 4.
Figure 7B:
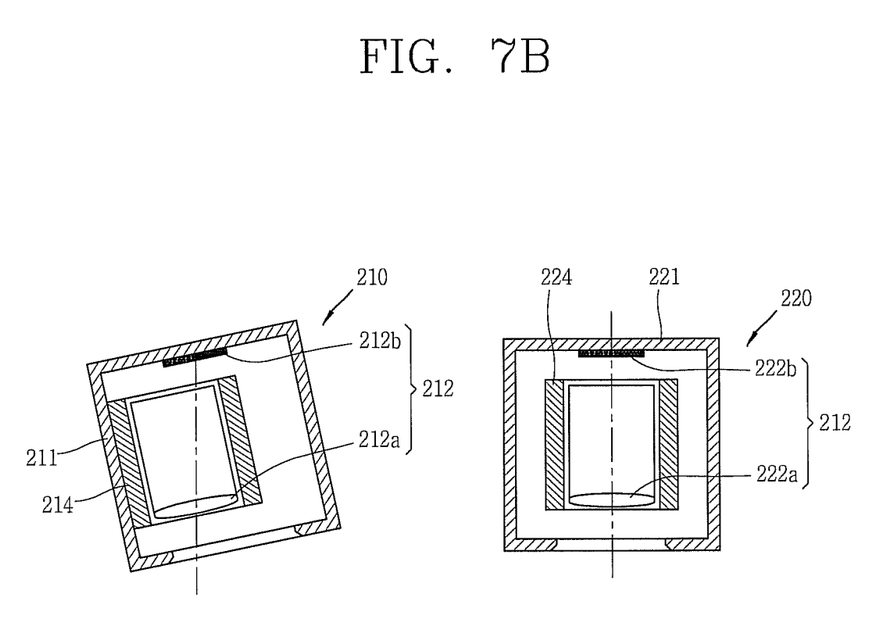

FIGS. 6A and 6B are views illustrating an example embodiment of the first camera and the second camera associated with the control method of FIG. 4. FIGS. 6C-6D are views showing a relative displacement of one optical axis. FIGS. 7A and 7B are views illustrating an example embodiment of the first camera and the second camera associated with the control method of FIG. 4. FIGS. 6A through 7B illustrate a cross section of the first camera unit 210 and the second camera unit 220 taken along line A-A shown in FIG. 5, respectively.

Referring to FIG. 6A, the first actuator 214 may be provided at the first capture unit 212 to control both a first lens unit 212a and a first image sensor 212b. The first actuator 214 may control an entire portion of the first capture unit 212. The first capture unit 212 may be controlled while maintaining an optical axis. The second camera 220 may be also implemented in a similar manner as the first camera 210.

However, as the location of the first camera 210 deviates by a rotation angle θ due to an external shock (or other event), a location of the first capture unit 212 may deviate at a same time. On the contrary, the location of the second camera 220 or the second capture unit 222 may not deviate. A relative displacement between the first capture unit 212 and the second capture unit 222 may be shown by a rotation angle θ.

When the first capture unit 212 and the second capture unit 222 deviate from their reference positions, a relative displacement between the first capture unit 212 and the second capture unit 222 may or may not occur. For example, when at least one of a direction or an amount (e.g. angle, distance, etc.) at which the first capture unit 212 and the second capture unit 222 deviate from each other is different, a relative displacement may be generated between the first capture unit 212 and the second capture unit 222. On the contrary, when the direction and the amount at which the first capture unit 212 and the second capture unit 222 deviate from each other are the same, a relative displacement may not be generated between the first capture unit 212 and the second capture unit 222.

When a relative displacement between the first capture unit 212 and the second capture unit 222 occurs, at least one of the first actuator 214 or the second actuator 224 may be driven to compensate for the relative displacement. For example, the first capture unit 212 may rotate according to driving of the first actuator 214 to compensate for the relative displacement between the first capture unit 212 and the second capture unit 222. More specifically, as shown in FIG. 6B, the first capture unit 212 may be rotated such that an optical axis of the first capture unit 212 is parallel to an optical axis of the second capture unit 222.

The first camera 210 having the first capture unit 212 may include the first lens unit 212a (or first lens) and the first image sensor 212b, and the second camera 220 having the second capture unit 222 may include the second lens unit 222a (or second lens) and the second image sensor 222b. The first camera 210 may have a first predetermined optical axis OA1, and the second camera 220 may have a second predetermined optical axis OA2.

The first actuator 214 of the first camera 210 may move the first camera 210 in at least first and second directions. The second actuator 224 of the second camera 220 may move the second camera 220 in at least first and second directions. In at least one embodiment, a single actuator may perform the operations of the first activator 214 and the second actuator 224.

In the embodiment shown in FIGS. 6C-6D, the controller 180 may determine a relative displacement (ΔD) of the first predetermined optical axis OA1 or the second predetermined optical axis OA2 based on an analysis of an image formed by the first camera 210 and the second camera 220. At least one of the first actuator 214 or the second actuator 224 may move at least one of the first camera 210 or the second camera 220 in at least one of the first direction or the second direction based on the relative displacement (ΔD) such that an optical axis OA3 of the at least one of the first camera 210 or the second camera 220 is returned to the first predetermined optical axis OA1 or the second predetermined optical axis OA2, respectively.

In the embodiment of FIGS. 6C-6D, the controller 180 may determine a relative displacement ΔD of the first camera 210. The actuator 214 may move the first camera 210 in one of the first direction or the second direction based on the relative displacement such that an optical axis OA3 of the first camera 210 is returned to the first optical axis OA1.

The display unit 151 may display a perceived three-dimensional (3D) image based on a first image of the first camera 210 and a second image of the second camera 220.

Referring to FIG. 7A, the first actuator 214 may be provided at the first capture unit 212 to control the first lens unit 212a. The first actuator 214 may be provided at the first capture unit 212 to control the first image sensor 212b. In other words, the first actuator 214 may be provided to control part of the first capture unit 212. The second camera 220 may be implemented in a similar manner as the first camera 210.

In order to compensate a relative displacement between the first capture unit 212 and the second capture unit 222, at least one of the first actuator 214 or the second actuator 224 may be driven. For example, to compensate a relative displacement between the first capture unit 212 and the second capture unit 222, part of the first actuator 214 may be moved according to driving of the first actuator 214. More specifically, as shown in FIG. 7B, the first lens unit 212a may be moved such that an optical axis of the first capture unit 212 is parallel to an optical axis of the second capture unit 222.

In another embodiment, the relative displacement ΔD may be between a predetermined optical axis and an actual optical axis of a camera. Part of the actuator may move according to driving of the actuator so as to compensate for the relative displacement.

Figure 8A:
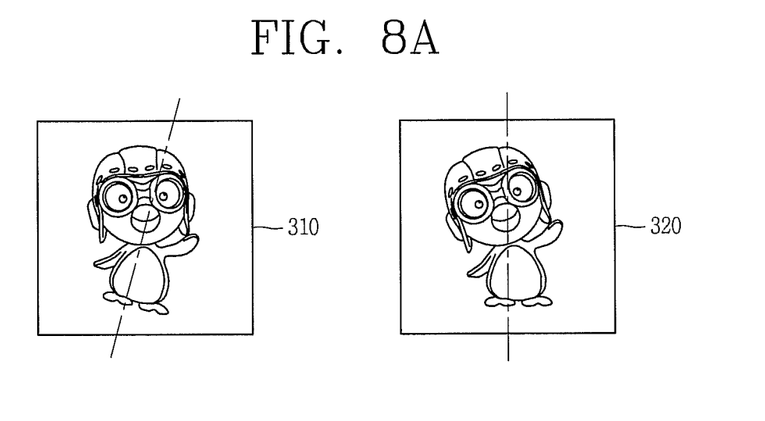
FIGS. 8A through 8C are views illustrating a method of producing a relative position compensation value according to an embodiment of the present invention.
Figure 8B:
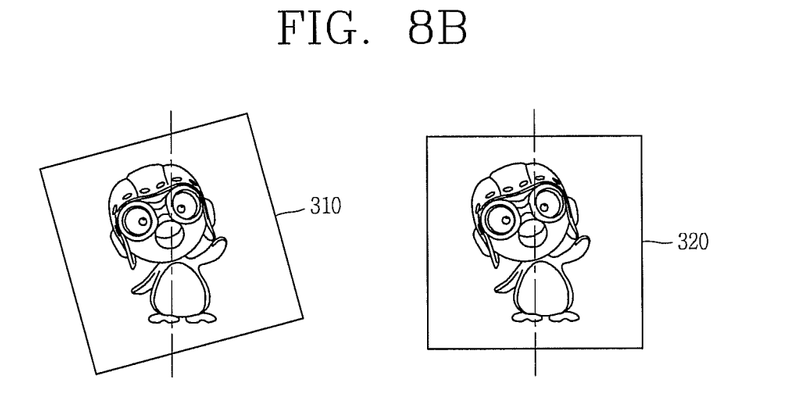
Figure 8C:
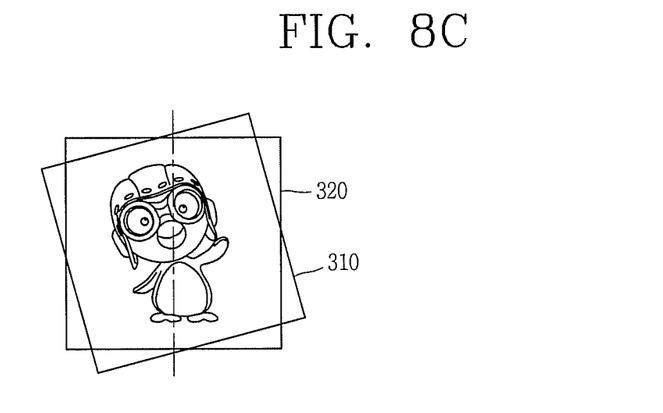

FIGS. 8A through 8C are views illustrating a method of producing a relative position compensation value according to an embodiment of the present invention. Other embodiments and configurations may also be provided.

FIG. 8A shows a first image 310 and a second image 320 forming a perceived 3-dimensional (3D) image. The perceived 3D image may be displayed on the display unit 151. The first image 310 may be acquired by capturing a subject (or object) through the first capture unit 212 (FIG. 3) located at a deviated position. The second image 320 may be acquired by capturing a subject (or object) through the second capture unit 222 (FIG. 3) located at a reference position (i.e., at a normal state). In this example, an image distortion between the first image 310 and the second image 320 may be generated. Accordingly, an image processing process may be carried out to compensate for the image distortion.

As shown in FIG. 8B, the controller 180 (FIG. 3) may rotate either the first image 310 or the second image 320 (e.g. the first image 310) to allow a shape of the subject included in the first image 310 to correspond to a shape of the subject included in the second image 320. The controller 180 may detect or compare outline information of each subject.

Subsequently, the controller 180 may combine the first image 310 and the second image 320 with each other to form a perceived 3-dimensional image, which may then be displayed on the display unit 151. In this example, data constituting an area in which the first image 310 and the second image 320 are non-overlapped with each other may be lost. Further, an amount of data lost while combining the first image 310 and the second image 320 may be increased as increasing a relative displacement between the first capture unit 212 and the second capture unit 222. Accordingly, the controller 180 may produce a relative position compensation value based on the amount of data lost while combining the first image 310 and the second image 320.

According to an embodiment, the foregoing method may be implemented as codes readable by a processor on a medium written by the program. Examples of the processor-readable media may include ROM, RAM, CD-ROM, magnetic tape, floppy disk, and optical data storage device, and/or the like, and may also include a device implemented in the form of a carrier wave (e.g. transmission via the Internet).

An embodiment of the present invention may provide a mobile terminal and control method thereof capable of enhancing quality of a 3-dimensional image.

A mobile terminal may include a camera module and a controller. The camera module may include a first capture unit configured to capture a subject to acquire a first image, a second capture unit, separated from the first capture unit, to capture the subject to acquire a second image, an actuator disposed at least one of the first and the second capture unit, and a drive unit configured to drive the actuator. The controller may analyze a 3-dimensional image formed by using the first image and the second image, and the controller may produce a relative position compensation value corresponding to a relative displacement between the first capture unit and the second capture unit according to a result of the analysis. Further, the drive unit may drive the actuator to control a relative position between the first capture unit and the second capture unit based on the relative position compensation value.

According to an embodiment, the controller may produce the relative position compensation value based on an amount of data lost from at least one of the first image and the second image to form the 3-dimensional image.

According to an embodiment, each of the first capture unit and the second capture unit may include a lens unit and an image sensor for converting an optical signal received through the lens unit into an electrical signal. The actuator may control at least one location of the lens unit and the image sensor in response to a drive signal of the drive unit.

According to an embodiment, the actuator may include a first actuator for controlling the location of the first capture unit and a second actuator for controlling the location of the second capture unit. The drive unit may drive at least one of the first actuator and the second actuator based on the relative position compensation value.

According to an embodiment, the camera module may further include a displacement measurement sensor configured to measure an absolute displacement with respect to a reference position of the first capture unit. The drive unit may drive the first actuator to control the position of the first capture unit based on an absolute position compensation value corresponding to the absolute displacement.

According to an embodiment, the position of the first capture unit may be controlled based on the absolute position compensation value, and then the first image and the second image may be acquired.

According to an embodiment, a center of the lens unit of the first capture unit may correspond to an optical axis at the reference position of the first capture unit.

A method of controlling a mobile terminal having a camera module may include capturing a subject through a first capture unit and a second capture unit of the camera module to acquire a first image and a second image, respectively. The method may also include analyzing a 3-dimensional image formed by using the first image and the second image, and producing a relative position compensation value corresponding to a relative displacement between the first capture unit and the second capture unit according to the analysis result. The method may further include controlling a relative position between the first capture unit and the second capture unit based on the relative position compensation value.

According to an embodiment, the relative position compensation value may be produced based on an amount of data lost from at least one of the first image and the second image to form the 3-dimensional image.

According to an embodiment, the camera module may include a first actuator for controlling the location of the first capture unit and a second actuator for controlling the location of the second capture unit, and in controlling the relative position, at least one of the first actuator and the second actuator may be driven based on the relative position compensation value.

According to an embodiment, in controlling the relative position, at least one location of the lens unit and the image sensor provided in each of the first capture unit and the second capture unit may be controlled according to the driving of the at least one actuator.

According to an embodiment, the control method may further include measuring an absolute displacement with respect to a reference position of the first capture unit, and driving the first actuator to control the location of the first capture unit based on an absolute position compensation value corresponding to the absolute displacement.

According to an embodiment, the location of the first capture unit may be controlled based on the absolute position compensation value prior to acquiring the first image and the second image.

Configurations and methods according to the above-described embodiments may not be applicable in a limited way to a mobile terminal disclosed herein, and all or part of each embodiment may be selectively combined and configured to make various modifications thereto.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a first camera module including a first capture unit to capture an object to acquire a first image, a first actuator, and a first case enclosing the first capture unit and the first actuator;
   a second camera module including a second capture unit, separated from the first capture unit, to capture the object to acquire a second image, a second actuator, and a second case enclosing the second capture unit and the second actuator,
   wherein the first capture unit includes a first lens unit and a first image sensor, the first image sensor fixedly attached on the first case for converting an optical signal received through the first lens unit into an electrical signal, and the second capture unit includes a second lens unit and a second image sensor, the second image sensor fixedly attached on the second case for converting an optical signal received through the second lens unit into an electrical signal, and
   wherein the first actuator is configured to control a location of the first lens unit with respect to the first image sensor, and the second actuator is configured to control a location of the second lens unit with respect to the second image sensor;
   a controller to analyze a perceived 3-dimensional (3D) image formed by using the first image and the second image, and to determine a relative displacement between the first capture unit and the second capture unit based on a result of the analysis; and
   a drive unit to drive at least one of the first actuator or the second actuator so as to move at least one of the first lens unit or the second lens unit based on the relative displacement such that an axis of the first capture unit becomes parallel to an axis of the second capture unit in spite of a misalignment between the first case and the second case, wherein the axis of the first capture unit is formed via a center of the first lens unit and a center of the first image sensor, and the axis of the second capture unit is formed via a center of the second lens unit and a center of the second image sensor.

2. The mobile terminal of claim 1, wherein the controller is configured to determine the relative displacement based on an amount of data lost from at least one of the first image or the second image that form the perceived 3-dimensional image.

3. The mobile terminal of claim 1, wherein the first camera module includes a displacement sensor to determine a displacement with respect to a reference position of the first capture unit.

4. A method of controlling a mobile terminal having a first camera module, a second camera module, a drive unit, and a controller, the method comprising:
   capturing, through a first capture unit of the first camera module and a second capture unit of the second camera module, to acquire a first image and a second image, respectively, wherein the first camera module includes the first capture unit, a first actuator, and a first case enclosing the first capture unit and the first actuator, and the second camera module includes the second capture unit, a second actuator, and a second case enclosing the second capture unit and the second actuator, wherein the drive unit drives at least one of the first actuator or the second actuator, wherein the first capture unit includes a first lens unit and a first image sensor, the first image sensor fixedly attached on the first case for converting an optical signal received through the first lens unit into an electrical signal, and the second capture unit includes a second lens unit and a second image sensor, the second image sensor fixedly attached on the second case for converting an optical signal received through the second lens unit into an electrical signal, and wherein the first actuator is configured to control a location of the first lens unit with respect to the first image sensor, and the second actuator is configured to control a location of the second lens unit with respect to the second image sensor;

analyzing, via the controller, a perceived 3-dimensional (3D) image formed by using the first image and the second image, and determining a relative displacement between the first capture unit and the second capture unit based on a result of the analyzing; and driving at least one of the first actuator or the second actuator using the drive unit so as to move at least one of the first lens unit or the second lens unit based on the relative displacement such that an axis of the first capture unit becomes parallel to an axis of the second capture unit in spite of a misalignment between the first case and the second case, wherein the axis of the first capture unit is formed via a center of the first lens unit and a center of the first image sensor, and the axis of the second capture unit is formed via a center of the second lens unit and a center of the second image sensor.

5. The method of claim 4, wherein determining the relative displacement comprises determining the relative displacement based on an amount of data lost from at least one of the first image or the second image that form the perceived 3-dimensional image.

6. A mobile terminal, comprising:

a first camera comprising a first capture unit to acquire a first image of an object and a first case enclosing the first capture unit;

a second camera comprising a second capture unit to acquire a second image of an object and a second case enclosing the second capture unit, wherein the first capture unit includes a first lens unit and a first image sensor, the first image sensor fixedly attached on the first case for converting an optical signal received through the first lens unit into an electrical signal, and the second capture unit includes a second lens unit and a second image sensor, the second image sensor fixedly attached on the second case for converting an optical signal received through the second lens unit into an electrical signal;

an actuator to control a location of the first lens unit with respect to the first image sensor and to control a location of the second lens unit with respect to the second image sensor;

a controller to determine a relative displacement between the first capture unit and the second capture unit based on an analysis of an image formed by the first image and the second image;

a display to display a perceived three-dimensional (3D) image based on the first image and the second image after the actuator configures an axis of the first capture unit parallel to an axis of the second capture unit; and a drive unit to drive the actuator so as to move at least one of the first lens unit or the second lens unit based on the relative displacement such that an axis of the first capture unit becomes parallel to an axis of the second capture unit in spite of a misalignment between the first case and the second case, wherein the axis of the first capture unit is formed via a center of the first lens unit and a center of the first image sensor, and the axis of the second capture unit is formed via a center of the second lens unit and a center of the second image sensor.

7. The mobile terminal of claim 6, wherein the controller is configured to determine the relative displacement based on data lost from at least one of the first image or the second image.

8. The mobile terminal of claim 6, wherein the first camera includes a sensor to determine a displacement with respect to a reference position of the first capture unit.

* * * * *